Oct. 14, 1952   W. S. BAKER   2,613,720
FORMING MECHANISM FOR COMPOSITE SEALING STRIPS
Filed Dec. 2, 1950   6 Sheets-Sheet 1

INVENTOR
WALTER SCOTT BAKER
BY Evans + McCoy
ATTORNEYS

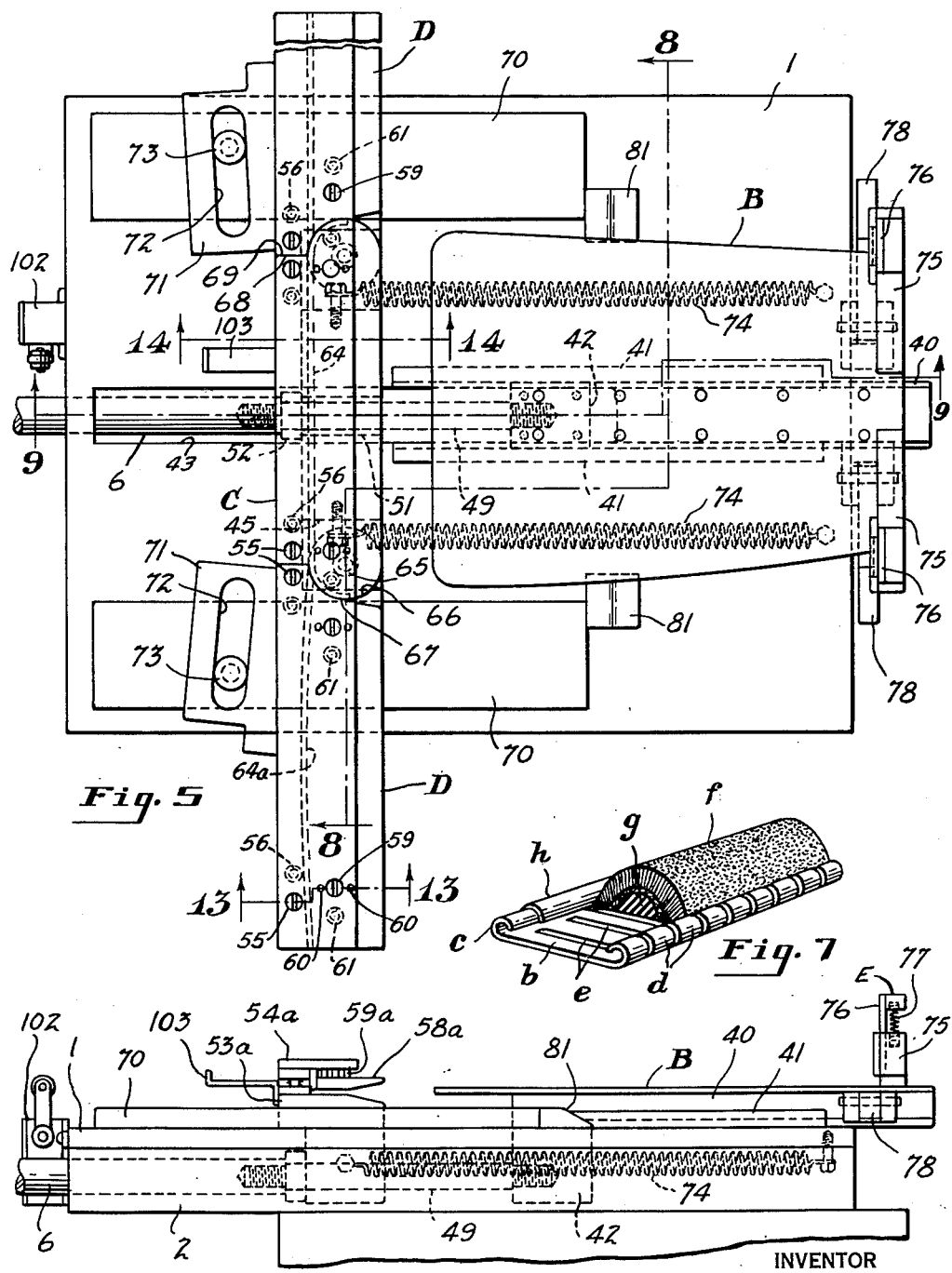

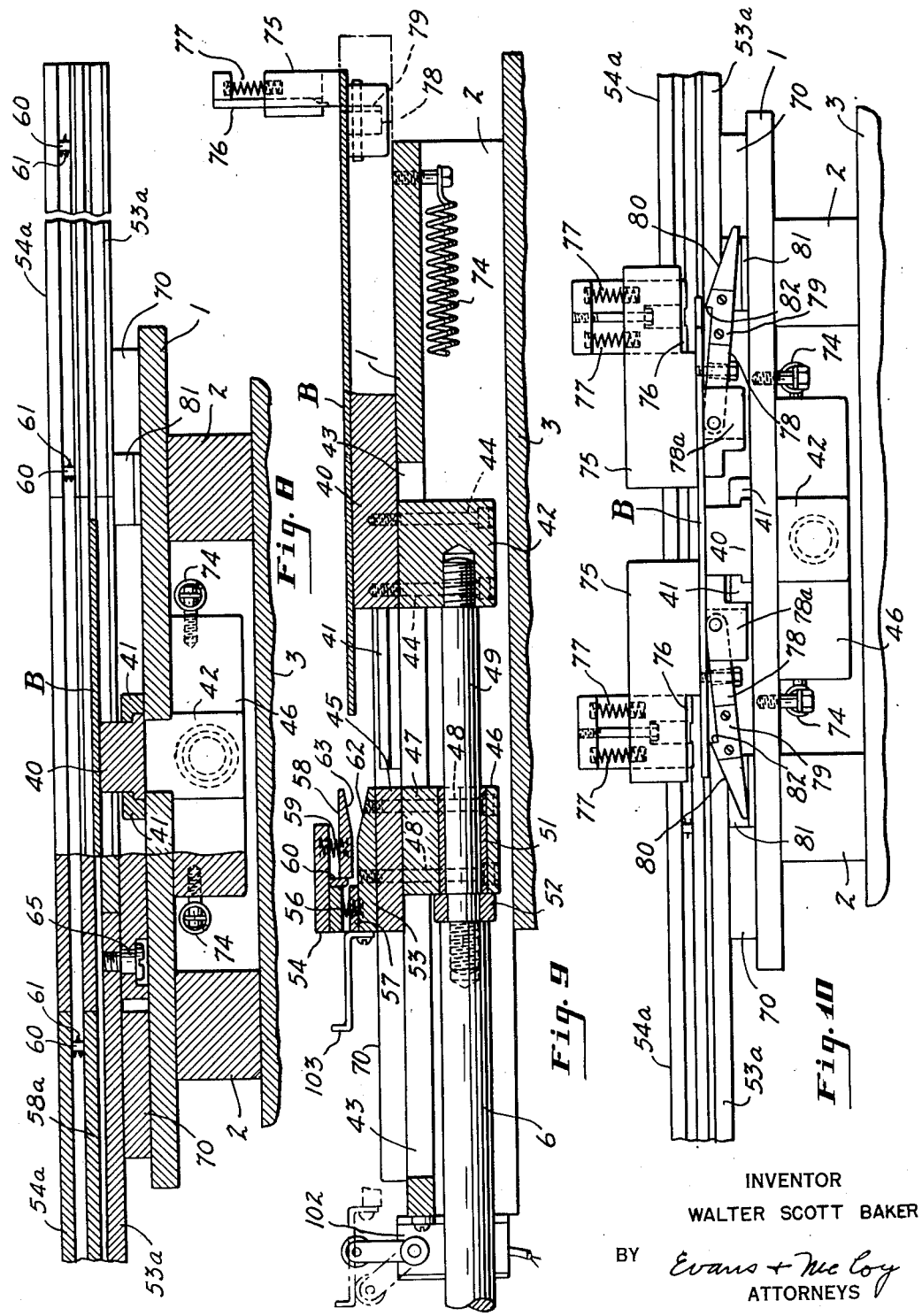

Oct. 14, 1952 W. S. BAKER 2,613,720
FORMING MECHANISM FOR COMPOSITE SEALING STRIPS
Filed Dec. 2, 1950 6 Sheets-Sheet 4

INVENTOR
WALTER SCOTT BAKER
BY Evans + McCoy
ATTORNEYS

Oct. 14, 1952 W. S. BAKER 2,613,720
FORMING MECHANISM FOR COMPOSITE SEALING STRIPS
Filed Dec. 2, 1950 6 Sheets-Sheet 5
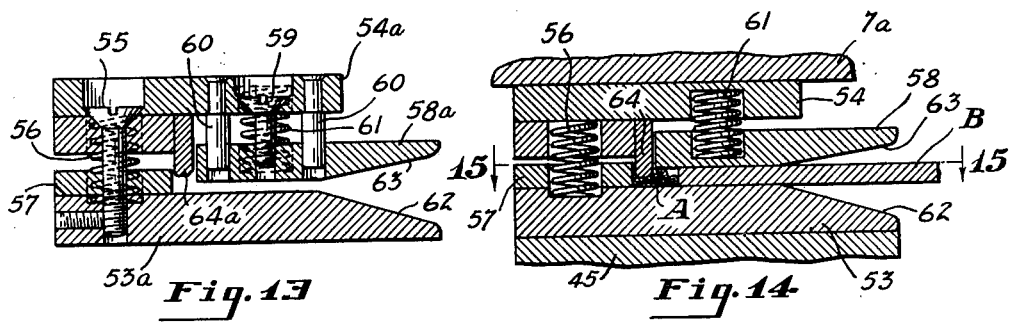
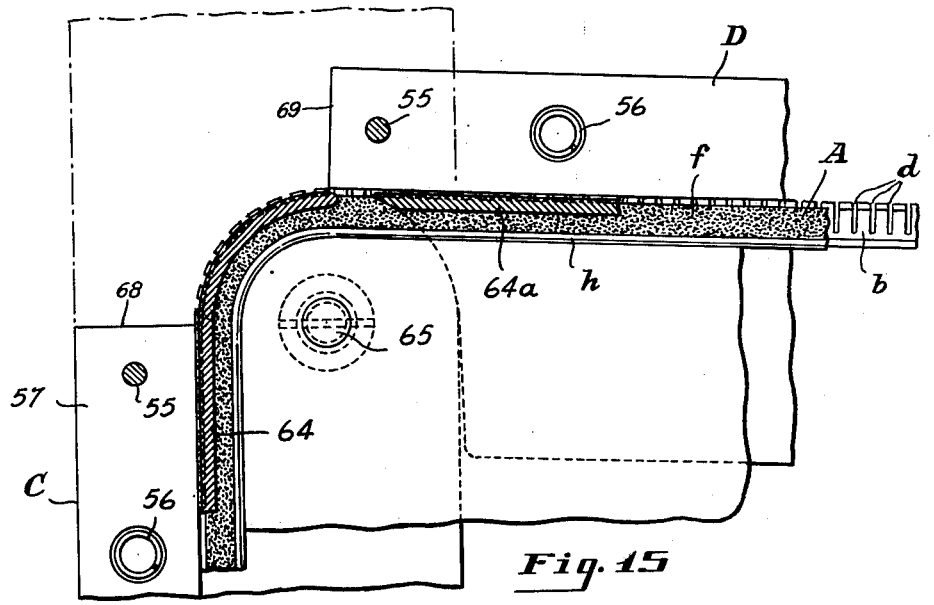
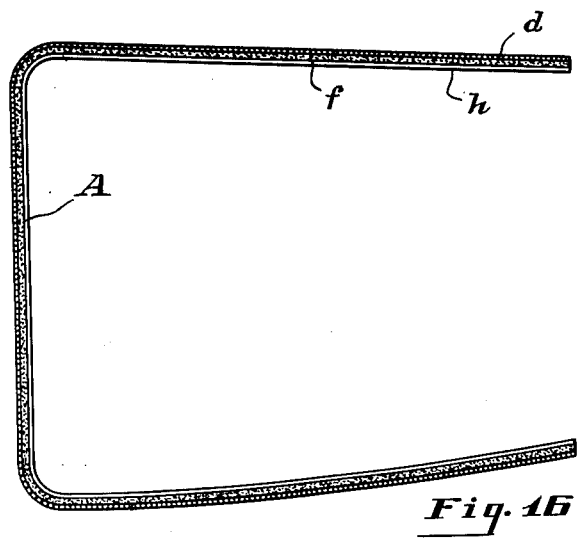
INVENTOR
WALTER SCOTT BAKER
BY Evans + McCoy
ATTORNEYS Patented Oct. 14, 1952

2,613,720

UNITED STATES PATENT OFFICE 2,613,720

FORMING MECHANISM FOR COMPOSITE SEALING STRIPS

Walter Scott Baker, Logansport, Ind., assignor to The General Tire and Rubber Company, Akron, Ohio, a corporation of Ohio Application December 2, 1950, Serial No. 198,769

12 Claims. (Cl. 153—2)

This invention relates to a mechanism for forming sealing strips adapted to be mounted in the glass receiving channels of motor vehicle windows. The sealing strips of such windows are mounted in the window channels bordering the window opening and are commonly formed to extend along three sides of the window opening. For example, the sealing strip may be formed to extend up one side of a window opening and along the top and bottom channels to the division bar.

Sealing strips of the type referred to are commonly composite strips having a sheet metal base portion to which a facing of sealing material is applied. These strips are commonly manufactured in the form of a continuous straight strip which is afterwards bent to conform to the window opening. To permit the base portion of the strip to be bent in its own plane, the sheet metal strip forming the base may be provided with slots extending inwardly from one edge thereof toward the other so that the slotted edge may be lengthened sufficiently to permit the strip to be bent in its own plane about its continuous edge. The edges of the metal base strip are rolled over to retain the facing material and the visible edge of the strip at the margin of the window opening is commonly provided with a continuous slotted tubular bead which slidably engages the body of the strip and which may be formed of or plated with a corrosion resistant metal.

The machine of the present invention provides means for bending a composite strip such as above described in its own plane while holding the strip against distortion during the bending operation. The strip is so held during the bending operation that pressure on the slotted edge of the strip is avoided, so that the slotted edge of the base strip is permitted to move freely as the strip is bent to lengthen the slotted edge at the corners.

Means is also provided to automatically cut the ends of the strip at the completion of the bending operation to square the ends and to simultaneously apply pressure to the slotted edge of the strip along its entire length to set the same in clamping engagement with the fabric facing and to set the strip in the form to which it has been bent.

The invention has for its object to provide a simple and efficient machine for forming, trimming and setting composite sealing strips of the character referred to, more particular objects being to provide means for quickly and easily bending the composite strip to conform to a window opening without causing distortion at the corners, to perform such bending operation without interfering with movements of the slotted edge of the base strip in the slotted tubular bead, and to impart a permanent set to the bent strip.

Reference should be had to the accompanying drawings forming a part of this specification, in which:

Fig. 5 is a plan view of the template of the strip clamping, bending and cut-off devices that are mounted on the press bed, viewed as indicated at 5—5 in Fig. 1;

Fig. 6 is a side elevation of the assembly shown in Fig. 5;

Fig. 7 is a perspective view of the composite glass channel sealing strip which is acted upon by the machine of the present invention;

Fig. 8 is a section taken on the broken line indicated at 8—8 in Fig. 5;

Fig. 9 is a section taken on the line indicated at 9—9 in Fig. 5;

Fig. 10 is a front elevation of the assembly shown in Fig. 5;

Fig. 13 is a transverse section through the strip supporting and retaining bars taken on the line indicated at 13—13 in Fig. 5;

Fig. 14 is a transverse section through the strip retaining and supporting bars taken on the line indicated at 14—14 in Fig. 5;

Fig. 15 is a fragmentary horizontal section taken on the line indicated at 15—15 in Fig. 14 with parts broken away to show underlying portions of the clamped strip;

Fig. 16 is a plan view of the finished sealing strip; and

Figure 3:
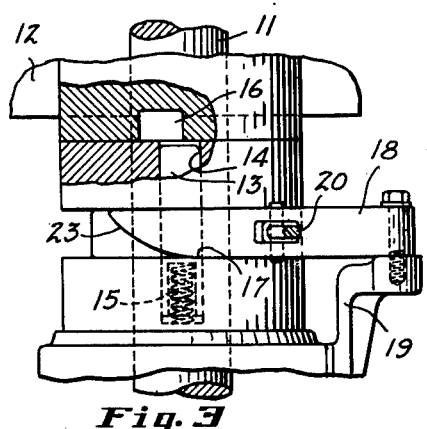
Fig. 3 is a fragmentary section taken on the line indicated at 3—3 in Fig. 2.
Figure 1:
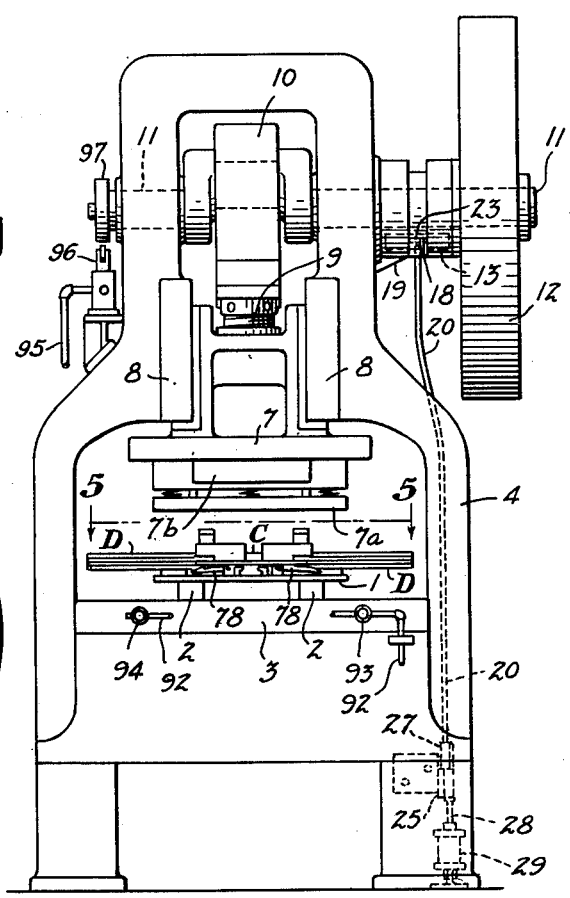
Figure 1 is a front elevation of the machine embodying the invention.

The machine of the present invention is designed particularly for bending and trimming to size a composite strip of the type best shown in Fig. 7 of the drawings. The sealing strip A which is acted upon by the machine of the present invention has a sheet metal base b provided with rolled edges c and d and having parallel slots e extending from the rolled edges d to adjacent the rolled edges c. The rolled edges c and d serve to retain a pile fabric seal strip f and between the fabric strip f and the base b a core g of fibrous material, rubber or the like may be placed. The slots e are provided for the purpose of permitting the strip A to be bent in its own plane, the bending of the strip causing the separated portions of the rolled edge d to move apart to lengthen the outer edge of the strip when the strip is bent to substantially U-shape form to conform to the shape of a window opening. The sealing strip is placed in the window channel with its rolled edge c facing the window opening and, in order to stiffen the strip and conceal the rolled edge c, a slotted tubular bead h which may be formed of sheet metal is provided which receives the rolled edge c.

The machine of the present invention is designed to bend a straight strip A of the proper length in the plane of its base b to substantially U-shape while the strip is held against distortion, and is so designed as to perform this bending operation without interference with the free movement of the separated portions of the edge d.

The machine of the present invention includes a strip bending and cut-off assembly which comprises a horizontally movable template B, a central clamping member C against which the central portion of the strip is clamped by the template B, strip bending wings D pivoted to the ends of the member C, and strip cut-off assemblies E mounted on the template B at its front end.

The strip bending and cut-off assembly of the present invention is carried by a supporting plate 1 that is mounted on spacing blocks 2 on the bed 3 of a suitable press 4, and the template B is reciprocated on the bed by means of a cylinder 5 connected to the template by a piston rod 6. The press 4 has an upper movable platen 7 mounted in vertical guides 8 and connected by an adjustable screw connection 9 with an eccentric block 10 that is moved up and down by means of a crankshaft 11. The crankshaft 11 is driven by a flywheel pulley 12 which is connected to the shaft 11 by a suitable trip operated one revolution clutch which when actuated permits the crankshaft to be turned through one revolution to depress the platen 7 and to return the same to its elevated position. The clutch includes a key 13 that is slidable lengthwise of the shaft 11 in a suitable keyway 14 disposed inwardly of the pulley 12. A spring 15 presses the key 13 towards the pulley 12, which is provided with one or more notches 16 in the hub thereof in which the key 13 is engageable when it is released and permitted to be moved by the spring 15.

The key 13 has a transverse slot 17 that is engaged by a cam bar 18 which normally holds the key 13 in retracted position free of the pulley 12. The bar 18 is pivoted to a bracket 19 fixed to the press frame to swing vertically into and out of engagement with the underside of the crankshaft 11. The cam bar 18 has a connecting rod 20 attached thereto and is normally held in engagement with the shaft 11 by a spring 21 that is mounted in a bracket 22 attached to the press frame and that exerts an upward thrust on the rod 20. The bar 18 has a tapered end 23 which enters the transverse slot 17 of the key 13 to cam the key 13 out of engagement with the pulley 12. The cam bar 18 normally engages in the slot 17 of the key and holds the key out of engagement with the pulley 12. When the trip rod 20 is depressed the bar 18 is pulled out of the notch 17 and the key 13 is pressed into a notch 16 of the pulley by the spring 15, causing the shaft 11 to rotate with the pulley. After actuation of the trip rod 20 it is immediately released and the spring 21 returns the bar 18 into engagement with the periphery of the shaft 11 so that when the shaft has completed one revolution the key 13 will have been engaged by the tapered end 23 of the bar 18 and pulled out of engagement with the pulley 12, stopping the shaft 11 after one complete revolution. The press mechanism above described is of conventional design.

For the purpose of the present invention a special trip mechanism is provided that acts upon an arm 24 that is pivoted at its forward end to the lower end of the rod 20 and at its rear end to a bracket 25 attached to the press frame. The arm 24 is normally held by the spring 21 in a horizontal position and is provided with a longitudinal slot 26 which receives a vertical latch member 27 that is attached to the upper end of an actuating member in the form of a piston rod 28 that extends from a fluid pressure cylinder 29 which is mounted to swing on a horizontal pivot 30. The latch member 27 extends through the slot 26 and has a notch 31 in its front face that provides a shoulder 32 for engagement with the top of the bar 24 so that the bar 24 is pulled downwardly when the piston rod 28 is moved downwardly. The latch member 27 has an inclined front face 33 below the notch 30 which engages with a roller 34 on the bracket 25 as the latch member is moved downwardly to move the latch member 27 rearwardly and release the bar 24 from the shoulder 32.

Figure 2:
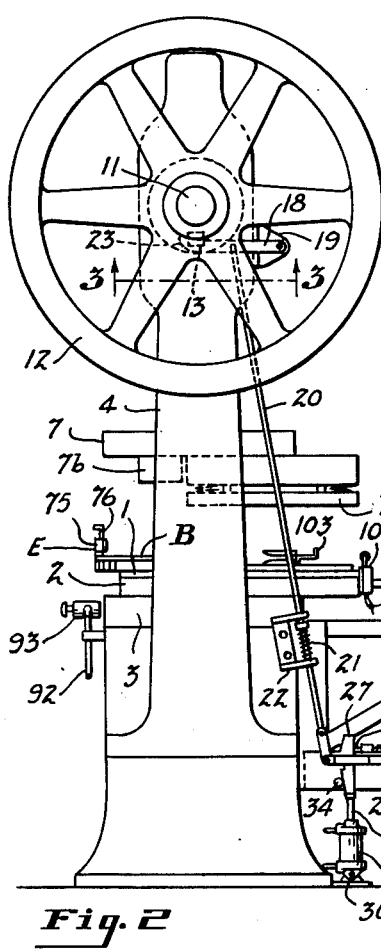
Fig. 2 is a side elevation of the machine shown in Fig. 1.
Figure 4:
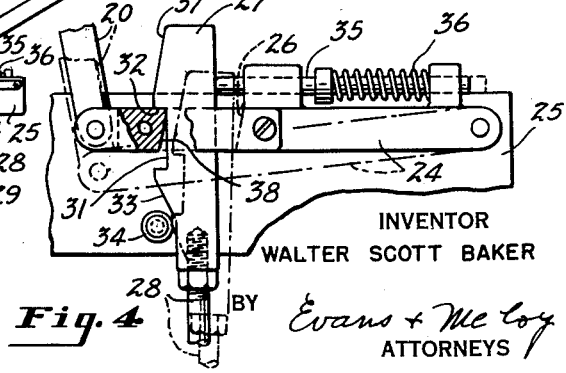
Fig. 4 is a fragmentary side elevation on an enlarged scale showing the clutch operated trip mechanism.

The rear side of the latch member 27 is engaged by a pin 35 slidably mounted on the bracket 25 and pressed forwardly toward the latch member 27 by a spring 36. The spring 36 normally holds the latch member 27 in its forward position with the shoulder 32 in engagement with the top of the bar 34. The piston rod 28 of the cylinder 29 is normally held in its elevated position shown in Fig. 2 and, when pressure is admitted to the cylinder 29 to lower the latch member 27, the latch member is moved rearwardly by the roller 34 to free the arm 24 from the latch member, so that the spring 21 will immediately return the cam bar 18 to clutch releasing position. The spring 36 maintains a forward pressure on the latch 27 throughout the range of movement of the latch member, and the front face of the latch member above the notch 31 is inclined for engagement with the forward end 38 of the slot 26, which is also inclined so that upon upward movement of the piston rod 28 the latch member will move upwardly in the slot 26 and rearwardly to compress the spring 36 which snaps the latch member forwardly into the position shown in Fig. 4 when the shoulder 32 is moved to a position above the top of the arm 24 to couple the arm 24 to the piston rod 28 for movement therewith upon the next actuation of the piston.

As shown in Figs. 8 and 9, the template B is carried by a slide in the form of a longitudinal bar 40 that is mounted for endwise movement in a guideway 41 on the supporting plate 1. A block 42 attached to the underside of the bar 40 adjacent its rear end extends through an elongated slot 43 in the plate 1, the block 42 being attached to the slide bar 40 by bolts 44. The clamping member C which slides on the plate 1 rearwardly of the slide bar 40 includes an elongated plate 45 resting upon the top of the plate 1 and disposed at right angles to the slot 43 and a guide member 46 that has a portion 47 fitting in the slot 43 and engaging the bottom of the plate 45, the guide member 46 being secured to the plate 45 by bolts 48 that extend through the slot 43. A rod 49 is screwed at its forward end into the block 42 and at its rear end into the forward end of the piston rod 6 extending from the cylinder 5. The rod 49 provides a rigid extension of the piston rod 6 and also serves to provide a lost motion connection between the template carrying slide 40 and the clamping member C. The rod 49 extends through and slidably fits in a bushing 51 mounted in the member 46 and a collar 52 on the rod 49 is interposed between the member 46 and the forward end of the piston rod 50.

The clamping member C has a transversely disposed strip supporting plate 53 secured by the bolts 48 to the top of the transversely disposed plate 45 and a strip retaining plate 54 which overlies the plate 53. As shown in Fig. 13, the retaining plate 54 is slidably mounted on vertical screw posts 55 attached to the bar 53 and is supported by compression coil springs 56 which serve to hold the plate 54 in its uppermost position. During the bending operation the strip A is supported on the plate 53 as shown in Fig. 14 with its rear edge in engagement with a stop strip 57 attached to the top of the plate 53. A presser plate 58 is slidably supported on vertical screw posts 59 and is guided by dowel pins 60. The plate 58 is normally held in its lowermost position by compression coil springs 61.

The plates 53 and 58 have beveled flaring forward edges 62 and 63 that facilitate entry of the strip A and template B between the two bars. The springs 61 normally hold the plate 58 slightly below the position which it occupies when the template B is inserted between the plates 53 and 58, so that a downward pressure is maintained upon the top of the template B and strip A during the bending operation. A retaining rib 64 is attached to the underside of the retaining plate 54 of the clamping member C and bridges the space between the rear edge of the presser plate 58 and the stop strip 57. The rib 64 serves to confine the rear edge of the strip A and hold the same against vertical movement during the bending operation, a chamber being provided for the strip A which confines the rear edge and body of the strip sufficiently to hold the strip against distortion during bending. The forward edge of the strip A is substantially free from pressure in the portions thereof that are bent about the rear corners of the template, so that the edge of the sheet metal strip f within the bead h can move with respect to the bead h during the bending operation.

The plate 58 is yieldingly held in engagement with the template B and the rib 64 forms an unyielding confining member for the rear edge of the strip A. The screw posts 55 can be adjusted to raise or lower the rib 64 and the screw posts 59 can be adjusted to vary the range of movement of the presser plate 58. The supporting and retaining plates 53 and 54 are disposed centrally of the plate 1 and the wings D are connected to each end of the plate 45 by a pivot 65 and have substantially the same construction as the central supporting and retaining members, each of the wings having a supporting plate 53a, a retaining plate 54a and a presser plate 58a which are substantially identical with the plates 53, 54 and 58. The centrally disposed supporting and retaining plates 53 and 54 and the corresponding pivoted plates 53a and 54a have interfitting arcuate end portions 66 and 67 which are formed concentric with the pivots 65 to maintain abutting relation between the plates 53a and 54a during the pivotal movement of the arms. The central clamping member C and the bending wings have shoulder portions 68 and 69 which limit the rearward movement of the wings D at a position where they are in alinement with the clamping member. Except for the formation of the parts adjacent the pivots the wings D are constructed in the same way as the central clamping member C and the elements of the wings D which are identical with corresponding elements of the member C are referred to by the same reference numerals.

The plates 53a of the wings D slide on plates 70 attached to the top surface of the plate 1 and the plates 53a have horizontally disposed brackets 71 attached to their rear edges which slide on the plates 70, the brackets 71 having elongated slots 72 which receive vertical rollers 73 mounted on the plates 70. The clamping member C is urged forwardly by coil springs 74 attached to the plate 1 and to the members 46. The springs 74 normally hold the clamping member C in the position shown in Fig. 5 where it is held by the rollers 73 against further movement.

Figure 11:
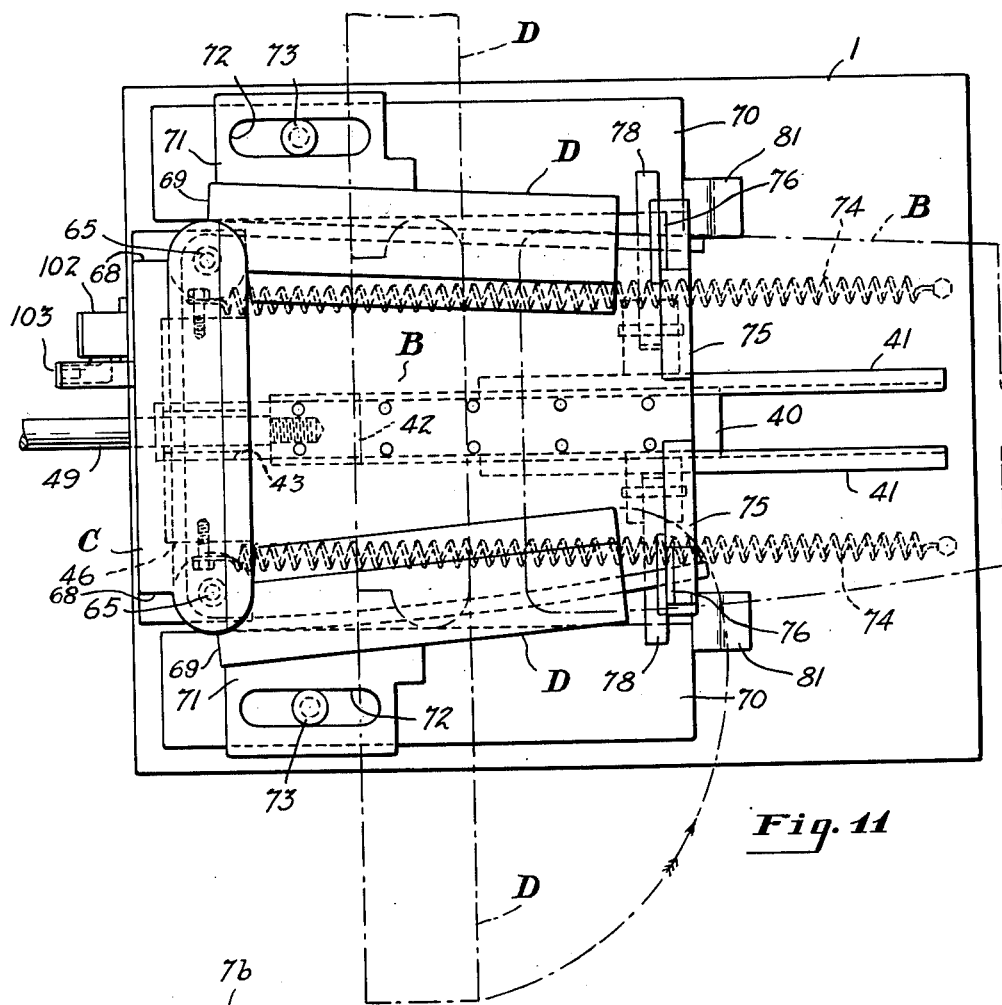
Fig. 11 is a plan view of the bending and cut-off assembly in its retracted cut-off position.
Figure 12:
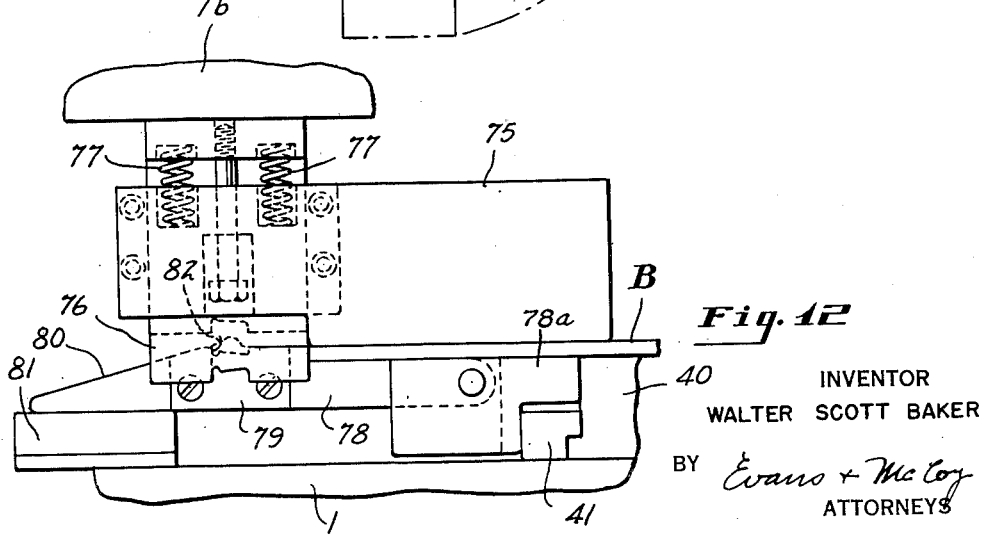
Fig. 12 is a fragmentary front elevation on an enlarged scale showing one of the strip cut-off devices.
Figure 17:
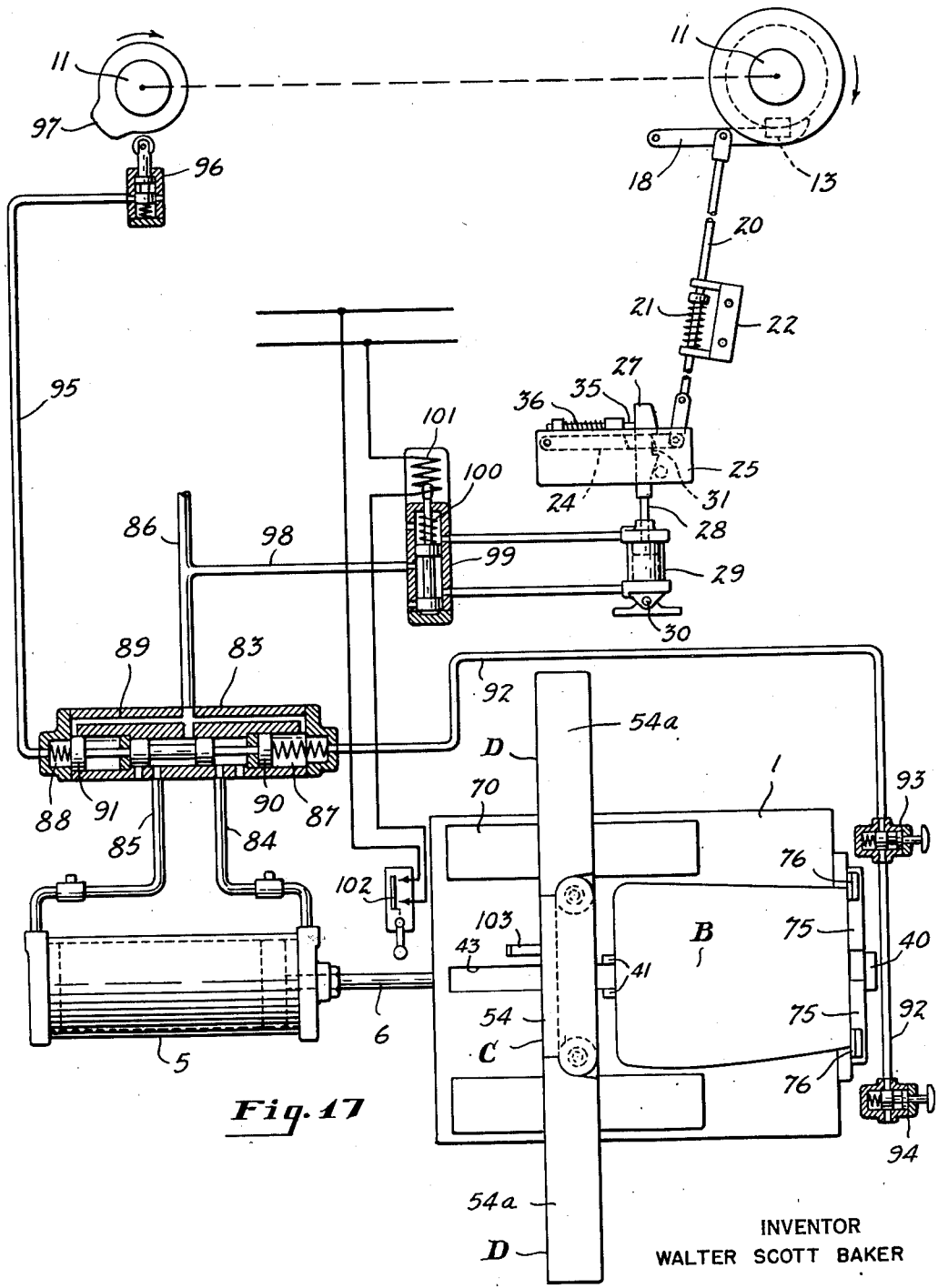
Fig. 17 is a diagrammatic view showing the fluid pressure and electrical control devices.

When the piston rod 6 is moved rearwardly by the cylinder 5 the template B is moved rearwardly into engagement with the strip A to be bent, which is initially placed in the tapered opening formed by the beveled faces 62 and 63 of the plates 53 and 58 of the clamping member C and the plates 53a and 58a of the wings D and pressure of the template B against the strip A forces the strip A rearwardly between the plates 53 and 58 and into engagement with the stop strip 57, after which the clamping member C is moved rearwardly. The rearward movement of the member C causes the pivoted wings D to be swung forwardly until the position shown in Fig. 11 is reached, bending the strip to conform to the template B and clamping the same against the rear and side edges of the template.

In order to confine the forward edge of the strip A at the corners during the bending operation, the retaining ribs 64 extend around the curved ends of the plate 58 as shown in Fig. 15, and the retaining ribs 64a of the bending wings have inner end portions formed to closely overlie the curved end portions of the ribs 64 of the central clamping member. As the bending arms approach the side edges of the template B the end portions of the strip A are guided into the spaces between the plates 53a and 58a and are confined throughout the length of the sides of the template between the template and wings. The rolled edge d of the strip is confined throughout its entire length beneath the ribs 64 and 64a and is compressed to set the strip to the form to which it is bent by depression of the retaining plates 54 and 54a by the platen 7 which has a yieldably mounted pad 7a engageable with the plates 54 and 54a.

At its forward edge the template B has laterally spaced brackets 75 attached thereto and in each of the brackets 75 there is mounted a vertically movable cutter blade 76. The blades 76 are disposed one over each side edge of the template at its forward end for engagement with the ends of the strip A which have been bent into engagement with the edges of the template. The blades 76 are normally held in an elevated position by springs 77 and these blades are engaged by the pad 7b on the movable platen 7 of the press, which is actuated upon completion of the bending operation to press the plates 76 and shear off the ends of the strip A.

In order to securely hold the ends of the strip A in proper position during the shearing operation, a pair of latch bars 78 are provided at the forward end of the template. The latch bars 78 are pivoted at their inner ends to brackets 78a attached to the under side of the template B to swing vertically toward and away from the underside of the template at its forward edge and these latch bars each carry a recessed shear plate 79 which receives an end of the strip A and positions the same for the cutting operation. The latch bars 78 have tapered ends 80 over which the ends of the strip A can ride as they move into engagement with the edge of the template and into the recess of the shear plate 79. The latch bars 78 are moved upwardly into engagement with the underside of the template as the template approaches its rearmost position by means of tapered cam plates 81 mounted on the plate 1. As the bending arms move into full engagement with the template the ends of the strip A ride over the inclined end portions 80 of the latch bars and into the recesses of the plate 79 which are provided with shoulders 82 for engagement with the outer edge of the strip A.

The platen 7 is actuated at the completion of the bending operation and the cutter blades 76 serve to sever the strip adjacent its ends. At the same time the plates 54 and 54a are engaged by the yieldable pad 7a on the platen 7 to press the ribs 64 and 64a against the outer rolled edge d of the strip A throughout the length of the strip. The bead h and rolled edge c are locked against relative sliding movement and the rolled edge d is uniformly flattened throughout the length of the strip A to tightly clamp the fabric f and to set the strip to the form to which it has been bent.

In the operation of the machine the cylinder 5 is first actuated to move the template B rearwardly and bend the strip A to the desired shape after the strip has been placed in the flaring opening between the plates 53 and 58 of the clamping member C and the plates 53a of the wings D and upon completion of the bending operation the cylinder 29 is automatically operated to trip the crankshaft clutch and cause operation of the cutoff. The cylinder 5 is controlled by a valve 83 of the pressure operated spool type which is connected by lines 84 and 85 to the front and rear ends of the cylinder 5. The valve 83 is connected centrally to a pressure line 86 and it is normally held either by spring pressure or by differential fluid pressure in a position such that the line 84 is connected to atmosphere and the line 85 is connected to the pressure line 86 to hold the template B in its forward position. The valve 83 has pressure chambers 87 and 88 at its opposite ends which are connected by a longitudinal passage 89 with the pressure line 86. The valve has pistons 90 and 91 at the ends thereof which are movable from positions substantially closing the ends of the passageway 89 to a position fully opening the port leading to the passageway, there being sufficient leakage past the pistons to normally maintain pressure in the chambers 87 and 88. The chamber 87 is connected to a pipe line 92 which extends across the front of the press at a convenient elevation and the pipe line 92 has two normally closed palm valves 93 and 94 in series which are adapted to be operated by the right and left hands of the operator. When the operator presses against both valves 93 and 94 these valves are opened, connecting the chamber 87 to the atmosphere. This exhausts pressure from the chamber 87 and permits the pressure which exists in the chamber 88 to push the valve to the right as shown in Fig. 11 to connect the pressure line 86 to the forward end of the cylinder 6 to retract the template. The rearward movement of the template causes a strip A previously placed between the supporting plate 53 and presser plate 58 to be folded against the template B.

The chamber 88 of the valve 83 is connected by a pipe line 95 to a normally closed valve 96 which is adapted to be opened by a cam 97 on the crankshaft 11 to connect the line 95 to atmosphere and reduce the pressure in the chamber 88 to permit the valve 83 to be returned to normal position. The operator holds the valves 93 and 94 open until the platen 7 has descended to operate the cutoff blades, whereupon these valves are released and permitted to close so that pressure will build up in the line 92 and chamber 87. As the shaft 11 nears the completion of its revolution the cam 97 engages the valve 96 and opens the valve so that the pressure in the chamber 87 will shift the valve to its normal position and return the template B to its outermost position.

The pressure line 86 is connected by a branch line 98 to a control valve 99 through which pressure is delivered to the cylinder 29. The valve 99 is normally held by a spring 100 in a position to supply pressure to the lower end of the cylinder 92 to hold the latch member 27 in its uppermost position. The valve 99 is adapted to be shifted by means of a solenoid 101 to a position connecting the upper end of the cylinder 29 to the pressure line to depress the latch member 27, the solenoid 101 being energized by means of a switch 102 at the rear end of the plate 1 which is engaged by a trip member 103 on the slide plate 45 when the slide plate reaches its rearmost position. The switch 102 serves to energize the solenoid 101 to instantly trip the crankshaft clutch to cause the crankshaft to make a single revolution and operate the strip cut-off mechanism.

Immediately upon the actuation of the valve 96 by the cam 97, the template B is moved forwardly and the slide plate 45 is moved forwardly by the springs 74, releasing the switch 102 which opens to deenergize the solenoid 101 and permit the spring 100 to shift the valve 99 to a position to elevate the latch member.

After each cycle of operation a formed sealing strip is removed from the template and a straight strip is placed in the space between the bars 53 and 58, after which the palm valves 93 and 94 may be actuated to initiate another cycle of operations.

It is to be understood that in accordance with the provisions of the patent statutes, variations and modifications of the specific devices herein shown and described may be made without departing from the spirit of the invention.

What I claim is:

1. A strip forming mechanism comprising a bed, a template having rear and side strip forming edges slidably mounted on said bed for movement in a direction transverse to its rear edge, strip clamping and bending members mounted on the bed for movement thereon in the direction of movement of the template and comprising a central strip clamping member parallel to the rear edge of the template and wing members pivoted to the ends of said clamping member and movable about their pivots to bend end portions of the strip into engagement with the side edges of said template, means for actuating the clamping and bending members to bend the strip into engagement with the side edges of the template, cutters carried by the template adjacent the forward ends of its side edges, and means controlled by said actuating means for operating said cutters to trim the ends of the formed strip.

2. A strip forming mechanism comprising a bed, a template having rear and side strip forming edges slidably mounted on said bed for movement in a direction transverse to its rear edge, strip clamping and bending members mounted on the bed for movement thereon in the direction of movement of the template and comprising a central strip clamping member parallel to the rear edge of the template and wing members pivoted to the ends of said clamping member and movable about their pivots to bend end portions of the strip into engagement with the side edges of said template, said clamping member and said wing members having supporting plates upon which the strip to be formed is supported, the top surfaces of said plates being positioned to engage the under side of said template, means for actuating the clamping and bending members to bend the strip into engagement with the side edges of said template, cutters carried by the template adjacent the forward ends of its side edges, means controlled by said actuating means for operating said cutters to trim the ends of the strip, and means for pressing the formed strip against said supporting plates substantially throughout the length thereof during the cutting operation.

3. A strip forming mechanism comprising a bed, a template slidably supported on said bed, said template having rear and side strip forming edges, its rear edge being transverse to its direction of movement, a strip clamping member mounted on the bed to the rear of said template, said member being parallel to the rear edge of said template and movable in the direction of movement of the template, strip bending wings pivoted to the ends of said clamping member and movable from positions in substantial alinement with the clamping member to positions substantially parallel to the side edges of the template, means connecting said wings to said bed to swing the same about their pivots upon rearward movement of said clamping member, cutters carried by said template at its forward end and projecting past said side edges, means for moving the template rearwardly to clamp a strip between the template and clamping member and to move the clamping member rearwardly to bend the strip against the side edges of the template, and means controlled by said actuating means for actuating said cutters upon completion of the rearward movement of the template to trim the ends of the formed strip.

4. A strip forming mechanism comprising a bed, a template slidably supported on said bed, said template having rear and side strip forming edges, its rear edge being transverse to its direction of movement, a strip clamping member mounted on the bed to the rear of said template, said member being parallel to the rear edge of said template and movable in the direction of movement of the template, strip bending wings pivoted to the ends of said clamping member and movable from positions in substantial alinement with the clamping member to positions substantially parallel to the side edges of the template, means connecting said wings to said bed to swing the same about their pivots upon rearward movement of said clamping member, cutters carried by said template at its forward end adjacent its opposite side edges, each cutter comprising a lower vertically movable shear member having a recess shaped to conform to the strip being formed and an upper vertically movable shear member, means for moving said template and clamping member rearwardly to cause the strip to bend to conform to the rear and side edges of the template, means operable during the movement of the template to move said lower shear members upwardly to position their strip receiving recesses alongside the side edges of the template, and means controlled by the template actuating means for moving the upper shear members downwardly to trim the ends of the formed strip.

5. A strip forming mechanism comprising a bed, a template slidably supported on said bed, said template having rear and side strip forming edges, its rear edge being transverse to its direction of movement, a strip clamping member mounted on the bed to the rear of said template for movement thereon in the direction of movement of the template, said clamping member having a supporting plate positioned for engagement with the bottom face of the template and provided with a stop extending parallel to the rear edge of the template and a spring supported retaining plate above the supporting plate provided with a downwardly projecting rib forwardly of said stop, strip bending wings pivoted to opposite ends of said clamping member, said wings being movable forwardly from positions in alinement with said clamping member to positions in engagement with the template and having supporting and retaining plates substantially corresponding to those of the clamping member, means connecting said wings to said bed to swing the same forwardly upon rearward movement of the clamping member, actuating means for moving the template rearwardly into engagement with the clamping member and for moving the template and clamping member simultaneously, and means controlled by the template actuating means for applying pressure to said retaining plates and through said ribs to the bent strip to set the same to the form to which it has been bent.

6. A strip forming mechanism comprising a bed, a template slidably supported on said bed, said template having rear and side strip forming edges, its rear edge being transverse to its direction of movement, a strip clamping member mounted on the bed to the rear of said template for movement thereon in the direction of movement of the template, said clamping member having a supporting plate positioned for engagement with the bottom face of the template and provided with a stop extending parallel to the rear edge of the template and a spring supported retaining plate above the supporting plate provided with a downwardly projecting rib forwardly of said stop, said rib having forwardly extending arcuate end portions, strip bending wings connected to opposite ends of said clamping member by pivots substantially concentric with said arcuate end portions of said ribs, said wings having strip supporting and retaining plates corresponding to those of the clamping member, the ribs of the retaining plates of said wings having inner ends closely adjacent said arcuate end portions, said wings being movable forwardly from positions in alinement with said clamping member to positions in engagement with the template and having supporting and retaining plates substantially corresponding to those of the clamping member, means connecting said wings to said bed to swing the same forwardly upon rearward movement of the clamping member, actuating means for moving the template rearwardly into engagement with the clamping member and for moving the template and clamping member simultaneously, and means controlled by the template actuating means for applying pressure to said retaining plates and through said ribs to the bent strip to set the same to the form to which it has been bent.

7. A strip forming mechanism comprising a press having a bed and a platen above the bed movable toward and away from the bed, mechanism for imparting a reciprocating stroke to said platen and for stopping the same in elevated position, a template on said bed having rear and side strip forming edges, strip clamping and bending means comprising a clamping member parallel to the rear edge of said template and bending wings pivoted to the ends of said clamping member and movable to positions along the side edges of the template, means for actuating said members to bend a strip into conformity with the rear and side edges of said template, a trip controlled by said actuating means for initiating operation of said platen actuating mechanism, and cutters carried by said template and actuated by said platen for trimming the ends of the formed strip.

8. A strip forming mechanism comprising a press having a bed and a platen above the bed movable toward and away from the bed, mechanism for imparting a reciprocating stroke to said platen and for stopping the same in elevated position, a template on said bed having rear and side strip forming edges, strip clamping and bending means comprising a clamping member parallel to the rear edge of said template and bending wings pivoted to the ends of said clamping member and movable to positions along the side edges of the template, means for actuating said members to bend a strip into conformity with the rear and side edges of said template, a trip controlled by said actuating means for initiating operation of said platen actuating mechanism, and means operated by said platen for applying pressure to the formed strip throughout its length to set the same to the form to which it is bent.

9. A strip forming mechanism comprising a press having a bed and a platen above the bed movable toward and away from the bed, mechanism for imparting a reciprocating stroke to said platen and for stopping the same in elevated position, a template on said bed having rear and side strip forming edges, strip clamping and bending means comprising a clamping member parallel to the rear edge of said template and bending wings pivoted to the ends of said clamping member and movable to positions along the side edges of the template, means for actuating said members to bend a strip into conformity with the rear and side edges of said template, a trip controlled by said actuating means for initiating operation of said platen actuating mechanism, means operated by said platen for applying pressure to the formed strip throughout its length to set the same to the form to which it is bent, and means operated by said platen for trimming the ends of said strip.

10. A machine for forming composite strips comprising a support, a strip clamping member mounted on said support for movement in a direction transverse to its length, said member having a strip supporting plate and a strip retaining plate for the supporting plate having a flat top face to receive the strip to be formed and a stop extending longitudinally against which an edge of the strip may be positioned and the retaining plate having a rigid rib forwardly of said stop and an upwardly yieldable presser plate forwardly of said rib, strip bending wings pivoted to said clamping member and forming continuations thereof, said wings having supporting plates, retaining plates, stops, ribs and presser plates alined with the corresponding parts of the clamping member, a template having a rear edge parallel to said clamping member and adapted to enter into the space between said presser plate and said supporting plate to press the strip to be formed against the stop member, said template having side edges adapted to be received between the supporting and presser plates of said wings, and actuating means for moving said template and said clamping member and wings relatively to clamp the strip against the rear and side edges of the template while the said strip is confined between the supporting plate and said rib and said presser plate.

11. A machine for forming composite strips comprising a support, a strip clamping member mounted on said support for movement in a direction transverse to its length, said member having a strip supporting plate and a strip retaining plate for the supporting plate having a flat top face to receive the strip to be formed and a stop extending longitudinally against which an edge of the strip may be positioned and the retaining plate having a rigid rib forwardly of said stop and an upwardly yieldable presser plate forwardly of said rib, strip bending wings pivoted to said clamping member and forming continuations thereof, said wings having supporting plates, retaining plates, stops, ribs and presser plates alined with the corresponding parts of the clamping member, a template having a rear edge parallel to said clamping member and adapted to enter into the space between said presser plate and said supporting plate to press the strip to be formed against the stop member, said template having side edges adapted to be received between the supporting and presser plates of said wings, actuating means for moving said template and said clamping member and wings relatively to clamp the strip against the rear and side edges of the template while the said strip is confined between the supporting plate and said rib and said presser plate, and means controlled by said actuating means for applying pressure to said retaining plates and through said plates to said ribs to set the strip to the form to which it has been bent.

12. A machine for forming composite strips comprising a support, a strip clamping member mounted on said support for movement in a direction transverse to its length, said member having a strip supporting plate and a strip retaining plate for the supporting plate having a flat top face to receive the strip to be formed and a stop extending longitudinally against which an edge of the strip may be positioned and the retaining plate having a rigid rib forwardly of said stop and an upwardly yieldable presser plate forwardly of said rib, strip bending wings pivoted to said clamping member and forming continuations thereof, said wings having supporting plates, retaining plates, stops, ribs and presser plates alined with the corresponding parts of the clamping member, a template having a rear edge parallel to said clamping member and adapted to enter into the space between said presser plate and said supporting plate to press the strip to be formed against the stop member, said template having side edges adapted to be received between the supporting and presser plates of said wings, actuating means for moving said template and said clamping member and wings relatively to clamp the strip against the rear and side edges of the template while the said strip is confined between the supporting plate and said rib and said presser plate, and means controlled by said actuating means for trimming the ends of the formed strip while the strip is being subjected to pressure between said rib and said supporting plate.

W. SCOTT BAKER.

REFERENCES CITED

The following references are of record in the file of this patent:

UNITED STATES PATENTS

| Number | Name | Date |
|---|---|---|
| 107,901 | Hall | Oct. 4, 1870 |
| 361,340 | Wilder | Apr. 19, 1887 |
| 629,412 | Wuelfing | July 25, 1899 |
| 811,975 | Vollmer | Feb. 6, 1906 |
| 972,195 | Jacobs | Oct. 11, 1910 |
| 1,432,573 | Senft | Oct. 17, 1922 |
| 1,710,261 | Kellogg | Apr. 23, 1929 |
| 1,785,116 | Fassinger | Dec. 16, 1930 |
| 2,476,595 | Green | July 19, 1949 |
| 2,552,617 | Bath | May 15, 1951 |

FOREIGN PATENTS

| Number | Country | Date |
|---|---|---|
| 22,312 | Denmark | July 30, 1917 |
| 105,097 | Great Britain | Mar. 28, 1917 |